United States Patent
Habermehl et al.

(10) Patent No.: US 12,385,853 B2
(45) Date of Patent: Aug. 12, 2025

(54) METHOD FOR DETERMINING A COATING PROPERTY

(71) Applicant: Endress+Hauser Flowtec AG, Reinach (CH)

(72) Inventors: Anne Habermehl, Erding (DE); Stefan Pflüger, Munich (DE); Wolfgang Drahm, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 175 days.

(21) Appl. No.: 18/257,668

(22) PCT Filed: Nov. 26, 2021

(86) PCT No.: PCT/EP2021/083212
§ 371 (c)(1),
(2) Date: Jun. 15, 2023

(87) PCT Pub. No.: WO2022/128416
PCT Pub. Date: Jun. 23, 2022

(65) Prior Publication Data
US 2024/0027367 A1    Jan. 25, 2024

(30) Foreign Application Priority Data

Dec. 16, 2020    (DE) ............... 10 2020 133 855.4

(51) Int. Cl.
*G01N 22/00*        (2006.01)
*G01F 1/74*         (2006.01)

(52) U.S. Cl.
CPC .............. *G01N 22/00* (2013.01); *G01F 1/74* (2013.01)

(58) Field of Classification Search
CPC .................................. G01N 22/00; G01F 1/74
(Continued)

(56) References Cited

U.S. PATENT DOCUMENTS 8,027,794 B2    9/2011    Xie
9,063,052 B2    6/2015    Folgeroe et al.
(Continued)

FOREIGN PATENT DOCUMENTS

DE            2434856 A1    2/1976
DE      102004057087 B3    1/2006
(Continued)

*Primary Examiner* — Raul J Rios Russo
(74) *Attorney, Agent, or Firm* — Mark A. Logan; Endress+Hauser (USA) Holding, Inc.

(57) ABSTRACT

A method for determining a coating property of a variable coating on an inner circumferential surface of a measuring tube includes emitting an excitation signal from the first microwave antenna, wherein the excitation signal comprises a sequence of high-frequency signals; receiving the excitation signal by the second microwave antenna; determining a first test variable from the received excitation signal and/or from an integral transform of the received excitation signal, wherein the first test variable is characteristic of the propagation of the excitation signal along a first propagation path, wherein the first propagation path describes an at least partial propagation of the excitation signal by the variable coating on the inner circumferential surface; and determining the coating property of the variable coating, in particular a variable dependent upon a coating thickness of the variable coating, based upon the first test variable.

15 Claims, 6 Drawing Sheets

(58) Field of Classification Search
USPC .......................................................... 324/637
See application file for complete search history.

(56) References Cited

U.S. PATENT DOCUMENTS

| | | | |
|---|---|---|---|
| 2009/0204346 A1* | 8/2009 | Xie ................... | G01N 33/2823 |
| | | | 702/45 |
| 2016/0054161 A1 | 2/2016 | Abou Khousa et al. | |
| 2017/0160069 A1 | 6/2017 | Folgero et al. | |
| 2017/0350748 A1* | 12/2017 | Shimura ................. | G01F 1/586 |
| 2020/0191625 A1 | 6/2020 | Pflüger et al. | |
| 2022/0244084 A1* | 8/2022 | Chatzikonstantinou | .................... |
| | | | G01F 15/02 |
| 2023/0168114 A1* | 6/2023 | Tschudin .............. | G01F 23/268 |
| | | | 73/861.12 |
| 2023/0221157 A1* | 7/2023 | Bitto .................... | G01F 1/8477 |
| | | | 73/861.355 |

FOREIGN PATENT DOCUMENTS

| | | |
|---|---|---|
| DE | 10016315 B4 | 11/2007 |
| GB | 2479741 A | 10/2011 |
| JP | 2003307502 A | 10/2003 |
| JP | 2007315912 A | 12/2007 |
| WO | 0046545 A1 | 8/2000 |
| WO | 2014173889 A1 | 10/2014 |
| WO | 2018036781 A1 | 3/2018 |
| WO | 2018121927 A1 | 7/2018 |

* cited by examiner

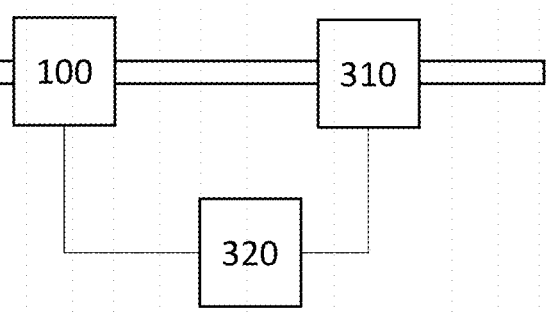

Fig. 8

Emitting an excitation signal by means of the first microwave antenna

↓

Receiving the excitation signal by means of the second microwave antenna

↓

Transforming the received excitation signal into a period by means of integral transformation

↓

Determining a first test variable using the integral transform

↓

Determining whether a coating has formed on the inner circumferential surface of the measuring tube on the basis of the first test variable

↓

Receiving a reflected excitation signal at the first microwave antenna

↓

Determining a third test variable as a function of the reflected excitation signal

↓

Determining a coating thickness

Fig. 9

METHOD FOR DETERMINING A COATING PROPERTY

CROSS-REFERENCE TO RELATED APPLICATIONS

The present application is related to and claims the priority benefit of DPMA Patent Application No. 10 2020 133 855.4, filed on Dec. 16, 2020, and International Patent Application No. PCT/EP2021/083212, filed Nov. 26, 2021, the entire contents of which are incorporated herein by reference.

TECHNICAL FIELD

The invention relates to a method for determining a coating property of a variable coating and to a measuring assembly.

BACKGROUND

In particular, microwaves can be used to determine the physical variables of permittivity and dissipation factor of a medium in a process line. From these two variables—measured either at one or over many different frequencies—it is possible to draw conclusions regarding application-specific parameters—for example, regarding the proportion of water in a mixture of water and other non-polar or low-polarity components.

The established transmission/reflection measurement is described in L. F. Chen, C. K. Ong, C. P. Neo, V. V. Varadan, V. K. Varadan—"Microwave Electronics, Measurement and Materials Characterization," John Wiley & Sons Ltd., 2004. For this purpose, the microwave signal is coupled at two different positions to the medium in a container or measuring tube, the scattering parameters (transmission and possibly reflection) between these coupling structures are measured, and, from the measured scattering parameters, the mentioned physical properties of the medium are calculated.

WO 2018/121927 A1 discloses a measuring assembly for analyzing properties of a flowing medium by means of microwaves. In addition to the microwave antennas, the measuring assembly has an electrically-insulating lining layer on the inner circumferential surface of the measuring tube. This lining layer forms a dielectric waveguide via which the microwaves can travel, at least in part, from a first microwave antenna to a second microwave antenna. An application for such a measuring assembly is the determination of solids fractions in the medium to be guided. Such applications are subject to coating formation—for example, due to the solid in the medium—on the inner circumferential surface of the measuring tube and on the microwave antennas.

SUMMARY

The invention is therefore based upon the object of providing a method for coating detection for a microwave arrangement with which the presence of a variable coating on the inner circumferential surface of the measuring tube can be detected.

The object is achieved by the method according to the present disclosure.

The method according to the invention for determining a coating property of a variable coating on an inner circumferential surface of a measuring tube of a measuring assembly for determining a medium property of a medium to be guided, in particular a multiphase medium,
wherein the measuring assembly has a first microwave antenna that is arranged in a first receptacle of the measuring tube in particular in a medium-contacting manner,
wherein the measuring assembly has a second microwave antenna arranged in particular diametrically to the first microwave antenna, which second microwave antenna is arranged in a second receptacle of the measuring tube in particular in a medium-contacting manner,
wherein the method comprises the method steps of:
emitting an excitation signal by means of the first microwave antenna,
wherein the excitation signal comprises a sequence of high-frequency signals;
receiving the excitation signal by means of the second microwave antenna;
determining a first test variable on the basis of the received excitation signal and/or on the basis of a transform, in particular an integral transform, of the received excitation signal,
wherein the first test variable is characteristic of the propagation of the excitation signal along a first propagation path,
wherein the first propagation path describes an at least partial propagation of the excitation signal by the variable coating on the inner circumferential surface;
determining the coating property of the variable coating, in particular a variable dependent upon a coating thickness of the variable coating, based upon the first test variable.

Advantageous embodiment of the invention are the subject matter of the dependent claims.

One embodiment provides that the first test variable comprise a first frequency at which an attenuation of the received excitation signal has a global extremum, in particular a maximum,
wherein, when the first frequency deviates from a frequency target range, the presence of a variable coating on the inner circumferential surface is inferred.

One embodiment provides that the first test variable comprise a frequency difference between a first frequency and a second frequency,
wherein a global extremum, in particular a maximum of the attenuation, is present at the first frequency,
wherein, at the second frequency, there is a local extremum deviating from the global extremum, in particular a maximum of the attenuation,
wherein, when the frequency difference deviates from a frequency difference target range, the presence of a variable coating on the inner circumferential surface is inferred.

One embodiment provides that the first test variable comprise a change in a phase difference between the emitted excitation signal and the received excitation signal as a function of the frequency,
wherein, when the change deviates from a change target range, the presence of a variable coating on the inner circumferential surface is inferred.

One embodiment provides that determining the first test variable comprise determining a number of deviations from right-uniquenesses between the real part and the imaginary part of the received excitation signal,
wherein the presence of a variable coating on the inner circumferential surface is inferred when the number deviates from a target range.

One embodiment provides the method step of:
transforming the received excitation signal into a time period, in particular by means of an integral transform and preferably by means of an inverse Fourier transform, range.
wherein the transformed excitation signal has a first time range,
wherein the first test variable is determined at least as a function of a value of the first time range.

One embodiment provides that the first time range have a lower limit and an upper limit,
wherein, for a characteristic length L of the contact of the measuring tube, the lower limit is greater than or equal to 0.7·L/mm ps, in particular greater than or equal to 2.3·L/mmps and preferably greater than or equal to 4·L/mm ps,
wherein the upper limit is less than or equal to 17·L/mm ps, in particular less than or equal to 13·L/mm ps and preferably less than or equal to 9·L/mm ps.

It has been found to be particularly advantageous to determine the first test variable within the limits of the previously described first time range. This eliminates influences of the medium to be guided and prevents false alarms being generated prematurely.

One embodiment provides that the first test variable comprise a first time value or a first amplitude value of the corresponding first time value,
wherein the assigned first amplitude value is maximal at the first time value.

One embodiment provides that the test variable comprise a sum or an integral of an amplitude signal, derived from the frequency spectrum of the received excitation signal, over a first time subrange,
wherein the first time subrange is within the first time range.

One embodiment provides the method step of:
determining a remaining operating time until a maintenance measure of the measuring assembly as a function of the first test variable, in particular a temporal change in the first test variable.

This has the advantage that the operator of the measuring assembly is informed in good time and can schedule maintenance outside of the maintenance interval or can take early action in order to remove the coating or to reduce the formation of the coating.

One embodiment provides the method step of:
determining a second test variable as a function of the received excitation signal or a transform, in particular one of the received excitation signal,
wherein the second test variable is characteristic of the propagation of the excitation signal along a second propagation path,
wherein the second propagation path describes a propagation of the excitation signal along a straight line connecting the first microwave antenna and the second microwave antenna,
wherein the transformed excitation signal has a second time range,
wherein the second time range is different from the first time range,
wherein the second test variable is determined in the second time range;
determining the medium characteristic of the medium to be guided, in particular a multiphase medium, as a function of the second test variable.

It is particularly advantageous if, in addition to the detection of a coating formation, a solids fraction in the medium can also be detected. This is done on the basis of a second test variable, which is preferably also determined on the basis of the transform of the received excitation signal.

One embodiment provides that the second time range have a lower limit and an upper limit,
wherein the lower limit is greater than or equal to 10·L/mm ps, in particular greater than or equal to 15·L/mmps and preferably greater than or equal to 21·L/mm ps,
wherein the upper limit is less than or equal to 40·L/mm ps, in particular less than or equal to 33·L/mmps and preferably less than or equal to 27·L/mm ps,
wherein the characteristic length L is an in particular minimum distance between the first microwave antenna and the second microwave antenna.

Precisely for applications where the medium to be guided contains water, the limitation of the second time range in the above limits, in which the second test variable is determined, has proved to be particularly advantageous.

One embodiment provides that the second time range have a second time value at which a second amplitude value associated with the second time value is maximal,
wherein the first test variable comprises a ratio between the first time value and the second time value, a ratio between the first amplitude value and the second amplitude value, and/or a ratio between the sum or the integral of the amplitude signal over a first time subrange and the sum or the integral of the amplitude signal over a second time subrange,
wherein the second time subrange is within the second time range.

One embodiment provides the method steps of:
receiving a reflecting excitation signal at the first microwave antenna;
determining a third test variable as a function of the reflected excitation signal and/or a transform, in particular an integral transform, of the reflected excitation signal;
determining a corrected tube cross-section as a function of the third test variable and/or determining a remaining operating time until a maintenance measure of the measuring assembly as a function of the first test variable and the third test variable, in particular a temporal change in the third test variable and/or first test variable.

Based upon the first test variable, at least the presence of a coating on the inner circumferential surface of the measuring tube can be determined. In addition, a coating thickness can be determined. In order to determine this unambiguously or more precisely, it is also advantageous to consider a third test variable. Taking the coating thickness into account, a degree of reduction in the inner measuring tube cross-section can be determined, which is particularly advantageous in devices for determining a further process property of the medium, which takes place with knowledge of the inner measuring tube cross-section, in order to avoid falsification of the determined process property.

A measuring assembly according to the invention comprises:
a measuring tube for guiding a medium,
wherein the measuring tube has an outer circumferential surface, an inner circumferential surface, and two, in particular diametral, receptacles;
a first microwave antenna that is arranged in a first receptacle of the measuring tube;
a second microwave antenna that is arranged in a second receptacle of the measuring tube;

a measuring circuit,
  wherein the measuring circuit has a high-frequency generator for feeding the first microwave antennas with an excitation signal, in particular with a sequence of high-frequency signals,
  wherein the measuring circuit is configured to determine at least one characteristic of a medium guided in the measuring tube, in particular a multi-phase medium, on the basis of an excitation signal received from the second microwave antenna,
  wherein the measuring circuit is additionally configured to carry out the method according to the invention.

BRIEF DESCRIPTION OF THE DRAWINGS

The invention is explained in greater detail with reference to the following figures. The following are shown:
FIG. 1b shows a side view of the measuring assembly of FIG. 1a;
FIG. 8 shows a schematic representation of a process plant with a measuring assembly according to the present disclosure;
and
FIG. 9 shows a method chain according to the present disclosure of the method for determining a coating property of a variable coating.

DETAILED DESCRIPTION

Figure 1A:
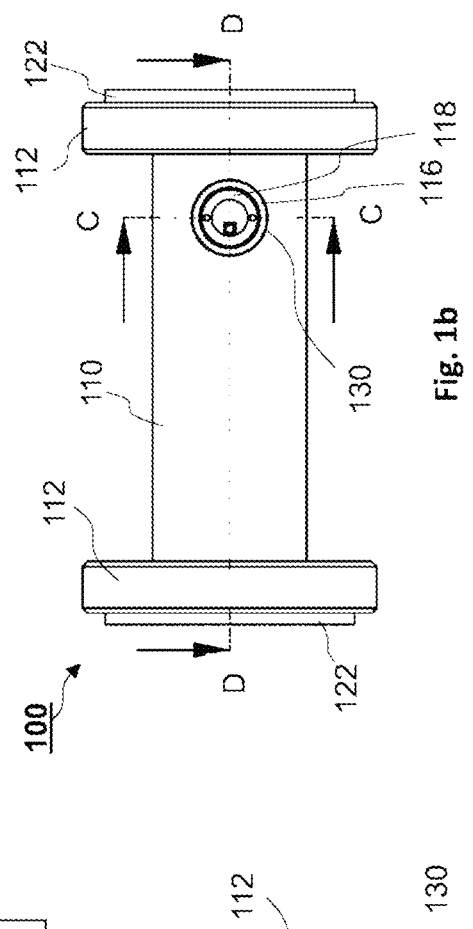
FIG. 1a shows a spatial representation of an exemplary embodiment of a measuring assembly according to the prior art.
Figure 1C:
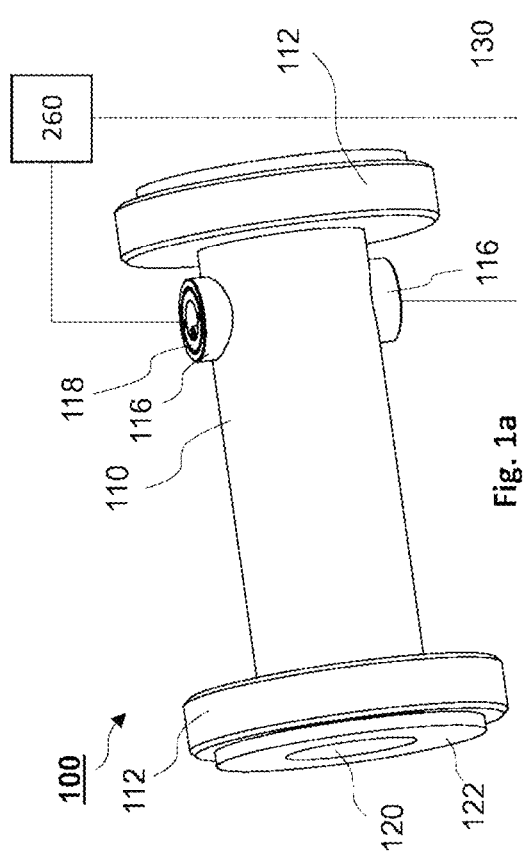
FIG. 1c shows a cross-section through the measuring assembly of FIG. 1b in the plane C-C.
Figure 1B:
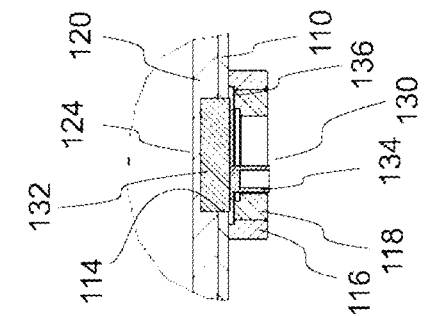
Figure 1E:
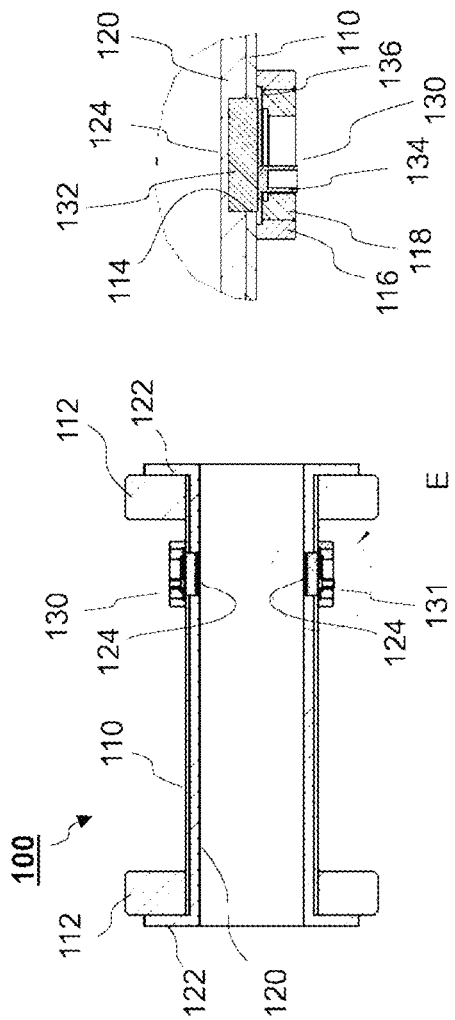
FIG. 1e shows a detail view of the measuring assembly of FIG. 1d at the position identified by E.
Figure 1D:
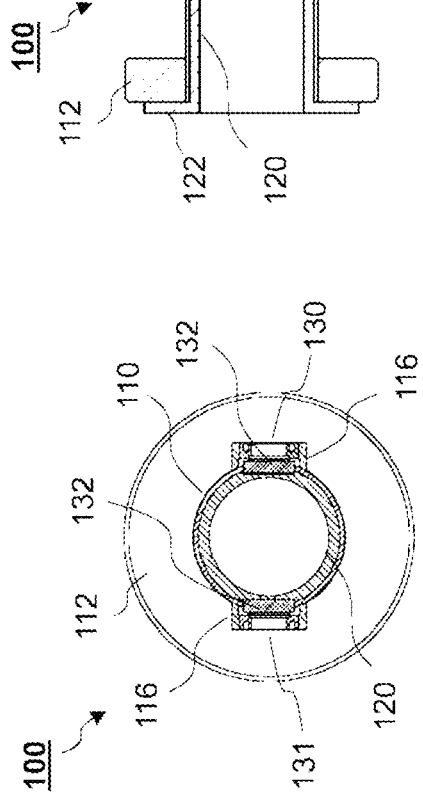
FIG. 1d shows a cross-section through the measuring assembly of FIG. 1b in the plane D-D.

The measuring assembly 100 shown in FIGS. 1a through 1e comprises a measuring tube 110 that is cylindrical in portions and has end-side, metallic connection flanges 112, which measuring tube is lined with a liner 120 that is not essential to the invention and that comprises a plastic—for example, a polyurethane or a fluoropolymer such as PFA or PTFE. The liner 120 may have face-side sealing surfaces 122 which lead out of the measuring tube 110 and rest against the face sides of the flanges 112. In order to be able to couple in and out microwaves, the measuring assembly 100 comprises two microwave antennas 130, 131, the details of which are shown in particular in FIG. 1e, arranged opposite one another on a circumferential surface of the measuring tube 110. In the region of the microwave antennas 130, 131, the measuring tube 110 respectively has one aperture 114, which is surrounded at the outer circumferential surface of the measuring tube 100 by a threaded sleeve 116, into which a clamping ring 118 is screwed in order to clamp a ceramic plate 132, which forms a support body for a planar antenna, as well as a terminal board 134, which is arranged on the outside of the ceramic plate 132, against the liner 120. In order to compensate for temperature fluctuations and manufacturing tolerances, an elastic ring 136 can additionally be arranged between the clamping ring 118 and the ceramic plate 132 or the terminal board 134. At the position of the ceramic plate 132, the liner 120 has a depression 124 from its outside, which is completely filled by the ceramic plate 132. As a result, a support body of a planar antenna is introduced into the liner 120, without affecting the integrity of the liner 120 towards the interior of the measuring tube. In addition, the compressive strength of the measuring assembly is maintained by suitable dimensioning of the ceramic plate 132 and the clamping ring 118. For the illustrated measuring assembly 100, it would be advantageous if the liner 120 were additionally delimited in the longitudinal direction of the measuring tube 110 by an electrically-conductive material, in particular metal. An example of this would be a metallic pipe of a pipeline connected via the process connections 112. Furthermore, the measuring assembly 100 comprises a measuring circuit 260 that is connected to the microwave antennas 130, 131. The measuring circuit 260 has a high-frequency generator for feeding the first microwave antennas 130 with an excitation signal, in particular with a sequence of high-frequency signals, and is configured to determine at least one process property of a medium guided in the measuring tube 110 on the basis of an excitation signal received from the second microwave antenna 131, wherein the process property corresponds to a solids fraction in the medium. Furthermore, the measuring circuit 260 is also configured to carry out the method according to the invention.

Figure 2:
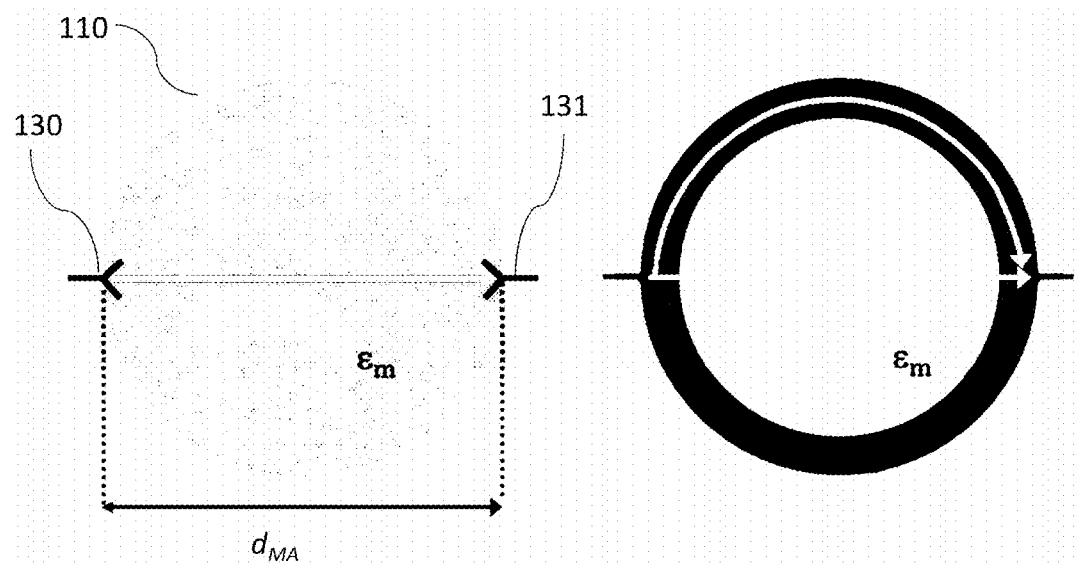
FIG. 2 shows exemplary representations for wave propagation of the transmitted excitation signal in a measuring tube with and without a variable coating.

FIG. 2 is an exemplary representation for wave propagation of the transmitted excitation signal in the case of a measuring tube without a variable coating (left) and with a variable coating (right). The cross-section shows a first microwave antenna 130 and a second microwave antenna 131, which are arranged diametrically on a measuring tube 110 and are spaced apart over a shortest distance $d_{MA}$. The first microwave antenna 130 is configured to generate the excitation signal and to feed it into the medium to be guided. The second microwave antenna 131 is configured to detect the transmitted excitation signal. Both microwave antennas 130, 131 are suitable for generating and detecting excitation signals. In this case, the measuring tube 110 comprises a metallic support tube without an electrically-insulating lining on the inner circumferential surface. If there is no variable coating in the measuring assembly 100, the excitation signal propagates substantially through the medium having the dielectric constant $\varepsilon_m$. For the sake of simplicity, the propagation of the excitation signal along the support tube is dispensed with. The white arrow indicates the shortest path for the excitation signal. A lower limit of the travel time of the excitation signal through the medium is $$\tau_M = \frac{\pi}{2} \cdot d_{MA} \cdot \frac{\sqrt{\varepsilon_{coating}}}{c_0} \sim 0.7 \text{ ns},$$

where $c_0$ is the speed of light in a vacuum, and the value of water is assumed for the dielectric constant $\varepsilon_M$. If a continuous coating having a dielectric constant of $\varepsilon_{coating}$ forms on the inner surface of the measuring tube, which coating connects the two microwave antennas 130, 131 to each other and covers the end faces in each case, then a further path forms along which the excitation signal is preferably propagated (see curved arrow). The travel time for the further path can be determined by $$\tau_M = \frac{\pi}{2} \cdot d_{MA} \cdot \frac{\sqrt{\varepsilon_m}}{c_0} \sim 0.7 \text{ ns},$$

wherein a typical value for saturated carbon is assumed as the value for the dielectric constant $\varepsilon_{coating}$ The travel time of the excitation signal along the further path is thus significantly below the lower limit for the travel time of the excitation signal through the medium. The method according to the invention for determining the presence of a coating property of a variable coating makes use of this and derives the presence of a coating and its coating properties on the basis of the determined travel times of the transmitted signal.

Figure 3:
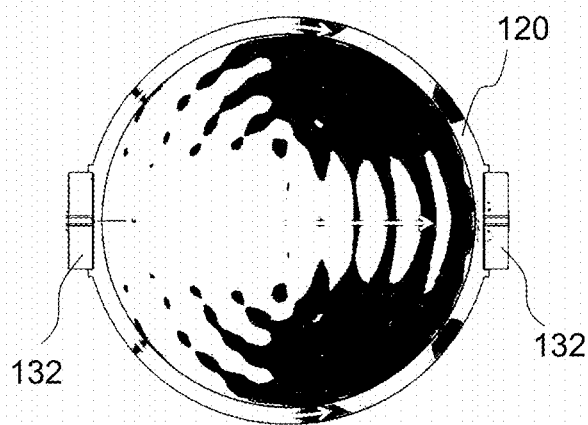
FIG. 3 shows exemplary simulation results for the field distribution of a wave propagation in a measuring assembly according to the present disclosure with a continuously variable coating.

Each of the modes, which propagate predominantly in the variable coating, leads to an associated current density distribution in the conductive boundary surfaces. However, such a current density distribution in the medium-contacting boundary layer of the liner also causes the propagation of an electromagnetic field into the non-ideally conductive medium. The boundary layer thus fulfills the function of an antenna. The faster propagation speed in the variable coating in comparison to typical aqueous media leads to a directed emission of electromagnetic power through the medium, as illustrated in FIG. 3. The gray levels here correspond to the electric field strength.

Figure 4:
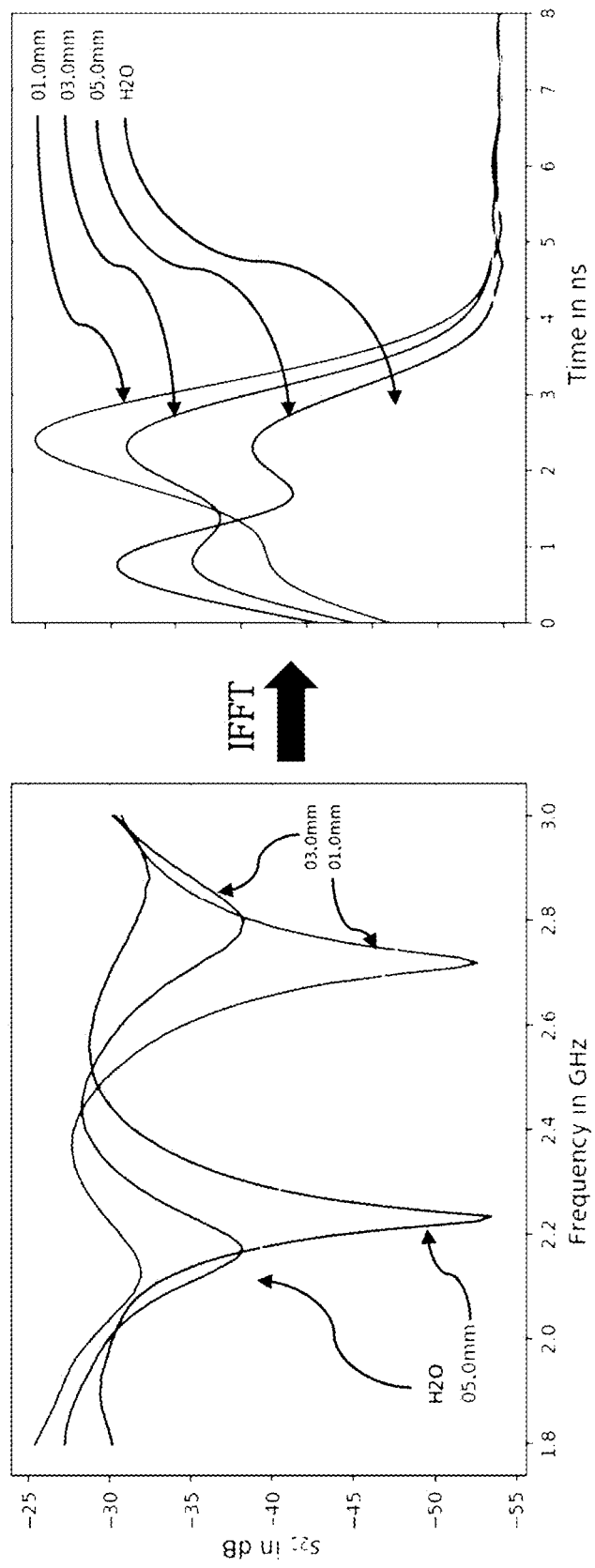
FIG. 4 shows a transmitted excitation signal over a frequency range of 1.8 to 3.0 GHz and the inverse fast Fourier transform of the transmitted excitation signal.

As an example, FIG. 4 shows transmitted excitation signals on water as the medium to be guided, wherein the excitation signal is a multiplicity of signals with different frequencies. The measured excitation signal of the $H_2O$ reference measurement, in which no coating is present, decreases continuously over the entire frequency range if the noise or the measurement inaccuracy is neglected, i.e., the attenuation of the excitation signal increases with increasing frequency. In the presence of a continuous coating on the inner circumferential surface of the measuring tube, regardless of the thickness of the coating (1, 3, or 5 mm), in each case two minima having different attenuation values are formed in the excitation signal. As the coating thickness increases, the frequencies of the minima also move to higher frequencies. An inverse Fourier transform—in this case, an inverse fast Fourier transform (IFFT)—transforms the excitation signal from the frequency range to a time range. For the reference measurement in the time range from 0 to 4 ns, the transformed excitation signal has only one maximum at a travel time of about 2.4 ns, which also corresponds to the expected travel time of the excitation signal through water. If a coating is present, a further maximum is formed at lower travel times (about 0.7 ns). In the case of a coating having a coating thickness of 1 mm, this maximum is only in the form of a shoulder, but grows with increasing coating thickness, so that, for a coating thickness of 5 mm, for example, the amplitude value is already higher than the contribution of the excitation signal through the water. The reason for the second maximum is the further path that forms due to the coating, along which the excitation signal propagates with a shorter travel time. The amplitude value for the travel time along the shortest distance increases with the presence of a coating. This is due to the improved coupling of the excitation signal into the water through the coating on the end face of the microwave antenna.

Figure 5:
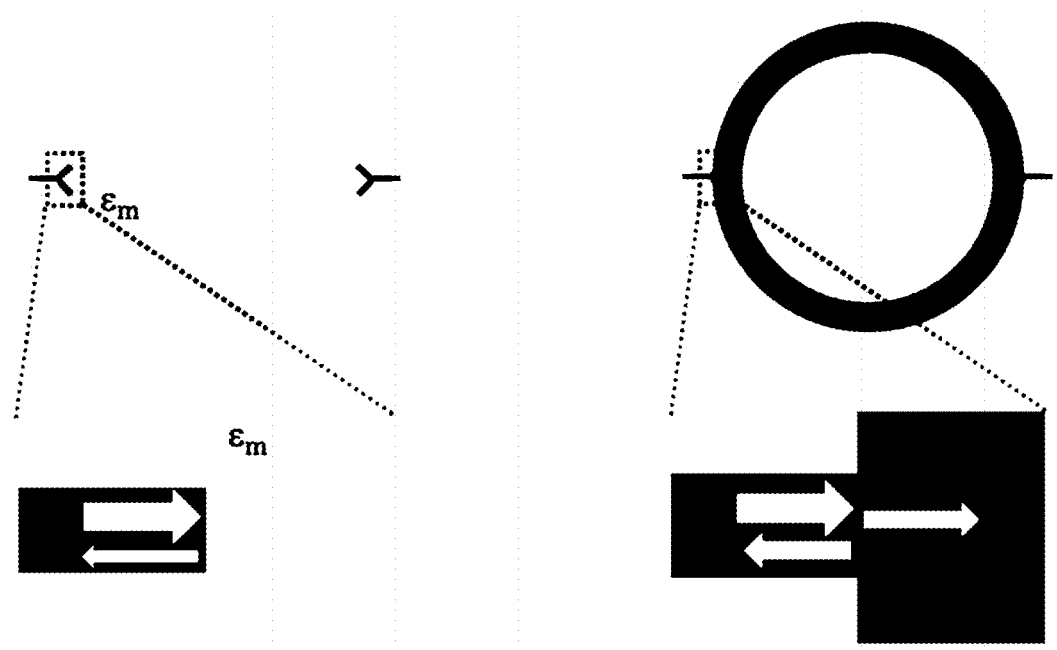
FIG. 5 shows exemplary representations for wave propagation of the reflected in a measuring tube with and without variable coating.

FIG. 5 shows exemplary representations for wave propagation of the reflected excitation signal in a measuring tube without a variable coating (left) and with a variable coating (right). In addition, FIG. 5 shows a close-up view for the two cases mentioned. In the coating-free case, the generated excitation signal (wide first arrow in the direction of the medium) is at least partially reflected at the interface to the medium with the dielectric constant $\varepsilon_m$ (narrow second arrow opposite to the first arrow). However, a large part of the excitation signal is fed into the medium (third arrow in the medium). If there is a coating with a dielectric constant $\varepsilon_{coating} < \varepsilon_m$ on the end face of the microwave antenna, a larger portion of the excitation signal is reflected at the interface to the coating and detected by the measurement at the microwave antenna. This has a significant influence on the measurement signal of the microwave antenna detecting the reflective excitation signal. The measurement signal, in particular the attenuation value of the measurement signal, increases as the coating thickness increases.

Figure 6:
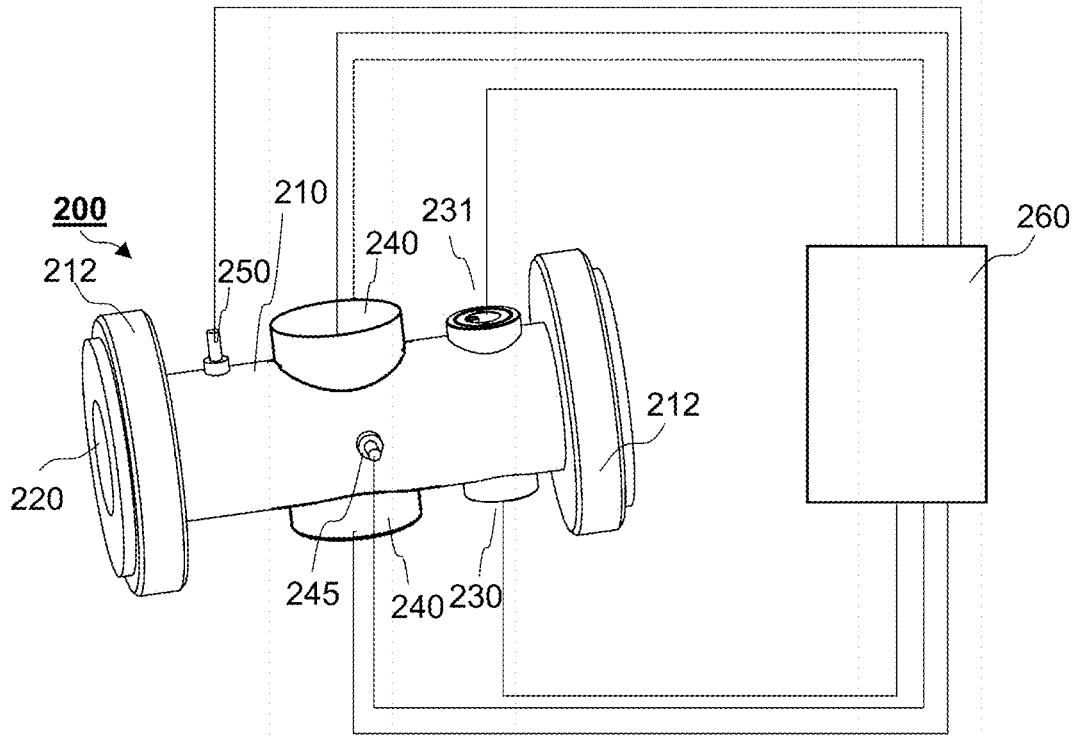
FIG. 6 shows a perspective view of a further embodiment of the measuring assembly according to the present disclosure.

Finally, FIG. 6 shows a further exemplary embodiment of a measuring assembly 200, which substantially corresponds to the measuring assembly of FIGS. 1a through 1e. In addition to two microwave antennas 230, 231 for the microwave signals, two field coil assemblies 240 are arranged in the same orientation on a measuring tube 210 for the magnetic-inductive flow measurement (MID). In the axial position of the field coil assemblies 240, two opposing electrodes 245 are arranged perpendicular to the direction of a magnetic field acting between field coil assemblies 240 and perpendicular to the axial direction of the measuring tube, which electrodes extend through the measuring tube 210 and a liner 220 into the interior of the measuring tube 210 in order to detect a flow-dependent potential of a flowing medium. (In the drawing, only one electrode is shown.) In addition, the measuring assembly 200 comprises a temperature senor 250 for detecting a temperature of the medium. The measuring assembly 200 further comprises a measuring circuit 260, to which the microwave antennas 230, 231, the field coil assemblies 240, the electrodes 245, and the temperature sensor 250 are connected. The measuring circuit 260 can have various subunits that separately process different measuring tasks of the measuring assembly 200.

Furthermore, the measuring circuit 260 comprises a high-frequency generator that is configured to feed a sequence of high-frequency signals of different frequencies to at least one of the microwave antennas 230, 231. In a modification, hollow conductor antennas having an integrated MID electrode at the position of the electrodes 245 can also be used, instead of the separate microwave antennas 230, 231.

Figure 7:
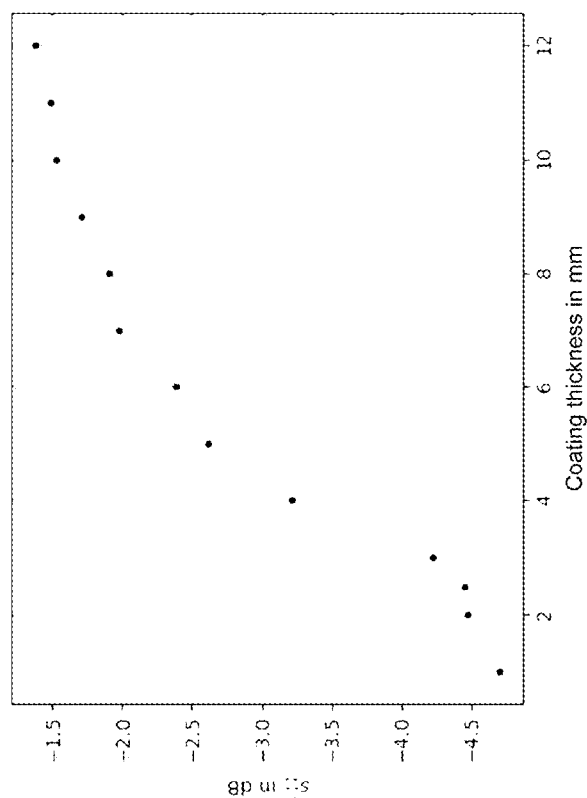
FIG. 7 shows a reflected excitation signal over a frequency range of 1.8 to 3.0 GHz and an average value of the reflected excitation signal as a function of the coating thickness.
Figure 7:
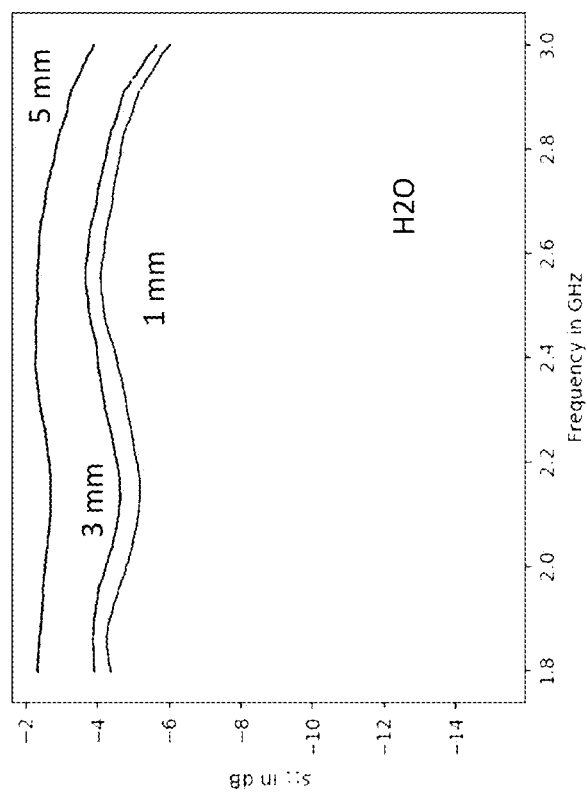

FIG. 7 shows a reflected excitation signal over a frequency range of 1.8 to 3.0 GHz (left graphic) and an averaging of the respective reflected excitation signal as a function of the coating thickness (right graphic). The reflected excitation signal in the case of a coating-free state has two pronounced extrema. In the frequency range from 1.8 to about 2.9 GHz, the excitation signal strength is lower than in the presence of a coating. As the coating thickness increases, the excitation signal strength also increases in the frequency range from 1.8 to about 2.9 GHz. Reporting the signal strength over a frequency subrange shows a dependence upon coating thickness. On the basis of the reporting—for example, averaging, summation, or integral over the frequency sub-range—a coating thickness can be determined.

FIG. 8 schematically shows a process plant 300 with a measuring assembly 100 according to the invention and a device 310 for determining a further process property of the medium, in particular a volume flow, which device has a measuring circuit 320 for determining a measured variable dependent upon the process property. This measuring circuit 320 is configured to determine a corrected process property as a function of the determined measured variable and the coating property determined by means of the measuring assembly 100. The further process property can, for example, be a calculated volume flow that deviates from the actual volume flow when the flow cross-sectional area is changed due to a coating on the inner circumferential surface of the measuring tube.

FIG. 9 shows a method sequence according to the invention for determining the coating property. The method sequence has the following method steps, which do not necessarily have to take place in the predetermined order:

Emitting an excitation signal by means of the first microwave antenna, wherein the excitation signal comprises a sequence of high-frequency signals or is a sequence of high-frequency signals.

Receiving the excitation signal by means of the second microwave antenna, wherein the received excitation signal is a frequency-dependent signal strength or a frequency-dependent attenuation value.

Transforming the received excitation signal into a time period by means of an inverse Fourier transform, wherein the transformed excitation signal has a first time range, wherein the first test variable is determined at least as a function of a value of the first time range. The first time range has a lower limit and an upper limit that correlate with the characteristic length L, which corresponds, for example, to the nominal width of the measuring tube or to the minimum distance of the microwave antenna. Accordingly, the lower limit is greater than or equal to 0.7·L/mm ps, in particular greater than or equal to 2.3·L/mmps and preferably greater than or equal to 4·L/mm ps, and the upper limit is less than or equal to 17·L/mm ps, in particular less than or equal to 13·L/mmps and preferably less than or equal to 9·L/mm ps.

Alternatively, other transforms (e.g., Laplace transform, Z transform, etc.) can be used to transform the frequency-dependent excitation signal into a time period.

Determining a first test variable on the basis of the integral transform of the received excitation signal, wherein the first test variable is characteristic of the propagation of the excitation signal along a first propagation path, wherein the first propagation path describes an at least partial propagation of the excitation signal by the variable coating on the inner circumferential surface. The portion of the excitation signal that passes through the variable coating on the inner circumferential surface of the measuring tube has, despite a long travel path, a shorter travel time when the dielectric constant of the coating $\varepsilon_{coating}$ is significantly smaller than the dielectric constant of the medium $\varepsilon_m$.

The first test variable can, for example, be a first frequency at which an attenuation of the received excitation signal has a global extremum, in particular a maximum. In this case, when the first frequency deviates from a frequency target range, the presence of a variable coating on the inner circumferential surface is inferred.

The first test variable can also be a frequency difference that exists between a first frequency and a second frequency, wherein a global extremum, in particular a maximum of the attenuation, is present at the first frequency, and a local extremum that differs from the global extremum, in particular a maximum of the attenuation, is present at the second frequency. If the frequency difference deviates from a frequency difference target range, the presence of a variable coating on the inner circumferential surface can be inferred.

The first test variable can also be a change in a phase difference between the emitted excitation signal and the received excitation signal as a function of the frequency. In this case, when the change deviates from a change target range, the presence of a variable coating on the inner circumferential surface is inferred.

Alternatively, determining the first test variable can comprise determining a number of deviations from right-uniquenesses between the real part and the imaginary part of the received excitation signal. In a Smith plot of the measured excitation signal, these right-uniquenesses can be clearly identified as loops. If the number deviates from a target range, the presence of a variable coating on the inner circumferential surface is inferred.

The first test variable is alternatively a first time value or a first amplitude value of the corresponding first time value, wherein the assigned first amplitude value is maximal at the first time value.

The test variable can also be a sum or an integral of an amplitude signal, derived from the frequency spectrum of the received excitation signal, over a first time subrange, wherein the first time subrange is within the first time range.

Determining the coating property of the variable coating on the basis of the first test variable. For example, the coating property can be a criterion for whether a coating has formed that connects the two microwave antennas to one another. In this case, a path is formed for the excitation signal, in which the excitation signal has a shorter travel time than over the minimum distance.

Receiving a reflective excitation signal at the first microwave antenna.

The measuring circuit is further configured to measure an excitation signal reflected at the interface with the medium and/or coating.

Determining a third test variable as a function of the reflected excitation signal or on the basis of an integral of the excitation signal over a predetermined or variable frequency range.

Determining a coating thickness as a function of the third test variable.

Alternatively, further method steps are provided:

determining a corrected tube cross-section as a function of the third test variable;

determining a remaining operating time until a maintenance measure of the measuring assembly as a function of the first test variable and the third test variable, in particular a temporal change in the third test variable and/or first test variable;

determining a remaining operating time until a maintenance measure of the measuring assembly as a function of the first test variable, in particular a temporal change in the first test variable.

Use of the measuring assembly to determine a solids fraction in a flowable medium requires the following method steps:

determining a second test variable as a function of the received excitation signal or a transform, in particular one of the received excitation signal, wherein the second test variable is characteristic of the propagation of the excitation signal along a second propagation path, wherein the second propagation path describes a propagation of the excitation signal along a straight line connecting the first microwave antenna and the second microwave antenna. The transformed excitation signal has a second time range that differs from the first time range and in which the second test variable is determined. The second time range has a lower limit and an upper limit, wherein the lower limit is greater than or equal to 10·L/mm ps, in particular greater than or equal to 15·L/mmps and preferably greater than or equal to 21·L/mm ps, and the upper limit is less than or equal to 40·L/mm ps, in particular less than or equal to 33·L/mmps and preferably less than or equal to 27·L/mm ps. A second time value at which a second amplitude value associated with the second time value is maximal is determined from the second time range. The first test variable is a ratio between the first time value and the second time value, a ratio between the first amplitude value and the second amplitude value, and/or a ratio between the sum or the integral of the amplitude signal over a first time subrange and the sum or the integral of the amplitude signal over a second time subrange, wherein the second time subrange is within the second time range.

determining the medium characteristic or the solids fraction of the medium to be guided as a function of the second test variable.

The invention claimed is:

1. A method for determining a coating property of a variable coating on an inner circumferential surface of a measuring tube of a measuring assembly for determining a medium property of a multiphase medium, the method comprising:
providing the measuring assembly, including:
a first microwave antenna that is arranged in a first receptacle of the measuring tube in a medium-contacting manner; and
a second microwave antenna that is arranged in a second receptacle of the measuring tube in a medium-contacting manner, wherein the second microwave antenna is arranged diametrically to the first microwave antenna;
emitting an excitation signal from the first microwave antenna;
wherein the excitation signal comprises a sequence of high-frequency signals;
receiving the excitation signal via the second microwave antenna;
determining a first test variable from an integral transform of the received excitation signal, wherein the first test variable is characteristic of a propagation of the excitation signal along a first propagation path that is an at least partial propagation of the excitation signal by the variable coating on the inner circumferential surface; and
determining the coating property of the variable coating based upon the first test variable.

2. The method according to claim 1,
wherein the first test variable is a first frequency at which an attenuation of the received excitation signal has a global extremum, the method further comprising:
inferring a presence of a variable coating on the inner circumferential surface when the first frequency deviates from a frequency target range.

3. The method according to claim 1,
wherein the first test variable is a frequency difference between a first frequency and a second frequency,
wherein a global extremum is present at the first frequency, and
wherein, at the second frequency, there is a local extremum deviating from the global extremum, the method further comprising:
inferring a presence of a variable coating on the inner circumferential surface when the frequency difference deviates from a frequency difference target range.

4. The method according to claim 1,
wherein the first test variable is a change in a phase difference between the emitted excitation signal and the received excitation signal as a function of the frequency, the method further comprising:
inferring a presence of a variable coating on the inner circumferential surface when the change deviates from a change target range.

5. The method according to claim 1,
wherein determining the first test variable includes determining a number of deviations from right-uniquenesses between a real part and an imaginary part of the received excitation signal, the method further comprising:
inferring a presence of a variable coating on the inner circumferential surface when the number deviates from a target range.

6. The method according to claim 1, further comprising:
transforming the received excitation signal into a time period using an integral transform,
wherein the transformed excitation signal has a first time range, and
wherein the first test variable is determined at least as a function of a value of the first time range.

7. The method according to claim 6,
wherein the first time range has a lower limit and an upper limit,
wherein, for a characteristic length L of the contact of the measuring tube, the lower limit is greater than or equal to 0.7·L/mm ps,
wherein the upper limit is less than or equal to 17·L/mm ps.

8. The method according to claim 6,
wherein the first test variable is a first time value or a first amplitude value of the corresponding first time value, and
wherein the assigned first amplitude value is maximal at the first time value.

9. The method according to claim 6,
wherein the test variable is a sum or an integral of an amplitude signal, derived from the frequency spectrum of the received excitation signal, over a first time subrange,
wherein the first time subrange is within the first time range.

10. The method according to claim 1, further comprising:
determining a remaining operating time until a maintenance measure of the measuring assembly as a function of a temporal change in the first test variable.

11. The method according to claim 6, further comprising:
determining a second test variable as a function of the received excitation signal or a transform of the received excitation signal,
   wherein the second test variable is characteristic of the propagation of the excitation signal along a second propagation path,
   wherein the second propagation path describes a propagation of the excitation signal along a straight line connecting the first microwave antenna and the second microwave antenna,
   wherein the transformed excitation signal has a second time range,
   wherein the second time range is different from the first time range, and
   wherein the second test variable is determined in the second time range; and
determining the medium characteristic of the multiphase medium as a function of the second test variable.

12. The method according to claim 11,
wherein the second time range has a lower limit and an upper limit,
wherein the lower limit is greater than or equal to $10 \cdot L/mm\ ps$,
wherein the upper limit is less than or equal to $40 \cdot L/mm\ ps$,
wherein the characteristic length L is an in particular minimum distance between the first microwave antenna and the second microwave antenna.

13. The method according to claim 12,
wherein the second time range has a second time value at which a second amplitude value associated with the second time value is maximal,
wherein the first test variable comprises a ratio between the first time value and the second time value, a ratio between the first amplitude value and the second amplitude value, and/or a ratio between the sum or the integral of the amplitude signal over a first time subrange and the sum or the integral of the amplitude signal over a second time subrange, and
wherein the second time subrange is within the second time range.

14. The method according to claim 1, further comprising:
receiving a reflective excitation signal at the first microwave antenna;
determining a third test variable as a function of the reflected excitation signal and/or a transform of the reflected excitation signal; and
determining a corrected tube cross-section as a function of the third test variable and/or determining a remaining operating time until a maintenance measure of the measuring assembly as a function of the first test variable and the third test variable.

15. A measuring assembly, comprising:
a measuring tube for guiding a medium, wherein the measuring tube has an outer circumferential surface, an inner circumferential surface, and two diametral receptacles;
a first microwave antenna that is arranged in a first receptacle of the measuring tube;
a second microwave antenna that is arranged in a second receptacle of the measuring tube; and
a measuring circuit,
wherein the measuring circuit has a high-frequency generator for feeding the first microwave antennas with an excitation signal,
wherein the measuring circuit is configured to determine at least one characteristic of a multi-phase medium guided in the measuring tube on the basis of an excitation signal received from the second microwave antenna, and
wherein the measuring circuit is additionally configured to:
   determine a first test variable from an integral transform of the received excitation signal, wherein the first test variable is characteristic of a propagation of the excitation signal along a first propagation path that is an at least partial propagation of the excitation signal by the variable coating on the inner circumferential surface; and
determining the coating property of the variable coating based upon the first test variable.

* * * * *